United States Patent
Moss et al.

(10) Patent No.: US 10,745,968 B2
(45) Date of Patent: Aug. 18, 2020

(54) CASTER ASSEMBLY AND APPARATUS INCORPORATING SAME

(71) Applicant: Wing Enterprises, Incorporated, Springville, UT (US)

(72) Inventors: N. Ryan Moss, Mapleton, UT (US); Aaron B. Major, Nephi, UT (US)

(73) Assignee: WING ENTERPRISES, INCORPORATED, Springville, UT (US)

(*) Notice: Subject to any disclaimer, the term of this patent is extended or adjusted under 35 U.S.C. 154(b) by 0 days.

(21) Appl. No.: 16/132,181

(22) Filed: Sep. 14, 2018

(65) Prior Publication Data
US 2019/0078385 A1 Mar. 14, 2019

Related U.S. Application Data

(60) Provisional application No. 62/558,756, filed on Sep. 14, 2017.

(51) Int. Cl.
| | |
|---|---|
| *E06C 1/397* | (2006.01) |
| *E06C 7/16* | (2006.01) |
| *E06C 7/18* | (2006.01) |
| *E06C 1/393* | (2006.01) |
| *E06C 1/18* | (2006.01) |

(Continued)

(52) U.S. Cl.
CPC .............. *E06C 1/397* (2013.01); *E06C 1/18* (2013.01); *E06C 1/393* (2013.01); *E06C 7/16* (2013.01); *E06C 7/182* (2013.01); *B60B 33/0039* (2013.01); *B60B 33/0068* (2013.01); *B60B 33/063* (2013.01); *E04G 1/24* (2013.01); *E04G 2001/246* (2013.01); *E06C 1/39* (2013.01); *E06C 7/423* (2013.01)

(58) Field of Classification Search
CPC . B60B 2340/12; B60B 2340/10; B60B 33/10; B60B 33/00; E06C 1/397
See application file for complete search history.

(56) References Cited

U.S. PATENT DOCUMENTS

| | | | |
|---|---|---|---|
| 4,182,431 A | 1/1980 | Wing et al. | |
| 4,579,381 A | * 4/1986 | Williams | ............. A61G 1/0562 296/20 |

(Continued)

OTHER PUBLICATIONS

International Search Report and Written Opinion for International Application No. PCT/US2018/051209, dated Dec. 12, 2018.

*Primary Examiner* — Alvin C Chin-Shue
(74) *Attorney, Agent, or Firm* — Dorsey & Whitney LLP (57) ABSTRACT

A caster assembly for use with varies structures, including ladders and elevated platforms is provided. In one embodiment, the caster assembly includes a first wheel coupled with a first bracket and configured to rotate about a first axis relative to the first bracket. A shaft is coupled to the first bracket as well as to a second bracket. The first bracket is rotatable relative to the second bracket about a second axis, which may be coincident with, or parallel to, an axis of the shaft. A third bracket is coupled with the shaft and is rotatable about the second axis, the third bracket being selectively locked in at least two positions relative to the second bracket. A second wheel is coupled with the third bracket, the second wheel being rotatable relative to the third bracket about a third axis.

19 Claims, 9 Drawing Sheets

(51) Int. Cl.
*E04G 1/24* (2006.01)
*E06C 1/39* (2006.01)
*B60B 33/06* (2006.01)
*B60B 33/00* (2006.01)
*E06C 7/42* (2006.01)

(56) References Cited

U.S. PATENT DOCUMENTS

| | | |
|---|---|---|
| 6,877,586 B2 | 4/2005 | Babkes et al. |
| 7,086,499 B2 | 8/2006 | Moss |
| 7,350,621 B2 | 4/2008 | Abraham |
| 9,016,434 B2 | 4/2015 | Moss et al. |
| 2009/0101437 A1* | 4/2009 | Abraham ............... B62B 5/0083 |
| | | 182/129 |
| 2009/0229918 A1 | 9/2009 | Moss et al. |
| 2013/0186710 A1* | 7/2013 | Moss ...................... E06C 1/393 |
| | | 182/104 |
| 2015/0210114 A1* | 7/2015 | Spektor ............... B60B 33/0076 |
| | | 16/35 R |
| 2015/0306908 A1* | 10/2015 | Sharratt .............. B60B 33/0028 |
| | | 16/45 |
| 2017/0226803 A1 | 8/2017 | Russell et al. |

* cited by examiner

CASTER ASSEMBLY AND APPARATUS INCORPORATING SAME

CROSS-REFERENCE TO RELATED APPLICATION

This application claims the benefit of U.S. Provisional Patent Application No. 62/558,756, filed on Sep. 14, 2017, entitled CASTER ASSEMBLY AND APPARATUS INCORPORATING SAME, the disclosure of which is incorporated by reference herein in its entirety.

BACKGROUND

Ladders are one type of apparatus conventionally used to provide a user with improved access to elevated locations that might otherwise be difficult to reach. One of the advantages of ladders is their convenience. Ladders are easily transported from one location to another, generally easy to set up and use at a specific location, and easy and convenient to store when not in use. Ladders come in many sizes and configurations, such as straight ladders, extension ladders, stepladders, and combination step and extension ladders. So-called combination ladders may incorporate, in a single ladder, many of the benefits of multiple ladder designs.

In an effort to provide more secure, safe and stable access to elevated locations, users often employ various accessories. For example, planks or other structures are sometimes combined with two or more ladders to act as a platform or scaffolding. In one particular example, so-called ladder jacks are often utilized in conjunction with a pair of ladders to provide a support for one or more wooden planks (e.g., 2 inch×10 inch planks or 2 inch×12 inch planks). Such a configuration enables a user to work on an elevated surface that exhibits a larger support surface area than that of the rung of a ladder and, thus, enables the user to work in a larger area without having to move a ladder multiple times. In another example, an attachment—sometimes referred to as a work platform—may be coupled to one or more rungs of a ladder in an effort to provide more surface area for the user to stand on, improving both their stability and comfort. However, breaking down or disassembling such a configuration, moving all of the components and then setting them up again can be time consuming and require considerable effort. Additionally, there are often no safety constraints used in such a configuration, making the use of planks a potential safety concern.

It is becoming increasingly common to require users to "tie off" or otherwise secure themselves when using a ladder or other elevating apparatus on a job site. Such a requirement may be instituted by a property owner, by an employer, or by a governmental body such as OSHA (Occupational Safety and Health Administration) to reduce the risk of injury from a fall. However, users of ladders (or other elevated support structures) sometimes find such requirements to be a nuisance and some may even try to avoid such requirements. At a minimum, users of a ladder will typically find that such requirements take additional time, making the worker less efficient at completing their task, even if they are safer while working.

It is also known that many users will often climb higher on a ladder than is recommended for the specific ladder—sometimes to the highest rung of a stepladder or even on the top cap of a stepladder—even though explicit warnings are provided by the manufacturer of the ladder against such behavior. Climbing beyond the highest recommended rung can make the ladder unstable. Additionally, the user may become unstable when climbing beyond a recommended height because, for example, they may not have any additional structure to lean against or grasp with a free hand while standing at or near the very top of the ladder.

Further, while there have been some attempts to provide solutions to the issues and concerns noted above, some proposed solutions have resulted in large apparatuses that are difficult to position and maneuver and also present issues in storing, transporting and shipping such apparatuses.

As such, the industry is continually looking for ways to improve the experience of using ladders and elevated platforms and to provide the users of such apparatuses with more efficient, effective, safe and comfortable experiences.

SUMMARY

The present disclosure is directed to a caster assembly as well as ladders and elevated platform apparatus incorporating such caster assemblies. In one particular embodiment, a caster assembly comprises a first bracket, a first wheel coupled the first bracket and configured to rotate about a first axis, a shaft coupled to the first bracket and a second bracket, wherein the first bracket is rotatable relative to the second bracket about a second axis, a third bracket coupled with the shaft and being rotatable about the second axis, the third bracket being selectively locked in at least two positions relative to the second bracket, and a second wheel coupled with the third bracket, the second wheel rotatable relative to the third bracket about a third axis.

In one embodiment, the at least two positions include a first position and a second position, the first position being approximately 90° from the second position about the second axis.

In one embodiment, the first axis and the second axis are substantially orthogonal relative to each other.

In one embodiment, the third axis and the second axis are substantially orthogonal relative to each other.

In one embodiment, the assembly further comprises a spring disposed between a portion of first bracket and a portion of the third bracket.

In one embodiment, the assembly further comprises a bushing disposed about a portion of the shaft adjacent the bracket, and wherein the spring is disposed about the shaft adjacent to the bushing.

In one embodiment, the spring is positioned between the bushing and the portion of the third bracket.

In one embodiment, the assembly further comprises a spring disposed about the shaft.

In another embodiment, an elevated platform apparatus comprises a first assembly having a pair of rails, a second assembly having a pair of rails, the second assembly being hingedly coupled with the first assembly, a caster assembly coupled with the first assembly. The caster assembly comprises a first bracket, a first wheel coupled the first bracket and configured to rotate about a first axis, a shaft coupled to the first bracket and a second bracket, wherein the first bracket is rotatable relative to the second bracket about a second axis, a third bracket coupled with the shaft and being rotatable about the second axis, the third bracket being selectively locked in at least two positions relative to the second bracket, and a second wheel coupled with the third bracket, the second wheel rotatable relative to the third bracket about a third axis.

In one embodiment, the apparatus further comprises a platform pivotally coupled to the first assembly.

In one embodiment, the platform includes a deck and a toe-kick structure, the toe-kick structure including at least one wall configured to be displaced between a first position, wherein the at least one wall extends outward from a working surface of the deck at a substantially perpendicular angle, and a second position, wherein the at least one wall is positioned substantially flat against the working surface of the deck.

In one embodiment, the first assembly and the second assembly are configured to pivot relative to each other between a deployed state and a collapsed state, wherein when the first and second assemblies are in the deployed state, the platform extends from the first assembly and engages a portion of the second assembly.

In one embodiment, the apparatus further comprises a cage associated with the platform, the cage including at least one bar and at least one gate, the at least one gate being configured to swing in a first direction upon a user stepping on to the platform from the first rail assembly, and swing back to a closed position after the user is standing on the working surface of the platform, the at least one gate also being limited from being displaced in a second direction, opposite the first direction, beyond the closed position.

In one embodiment, the at least two positions include a first position and a second position, the first position being approximately 90° from the second position about the second axis.

In one embodiment, the first axis and the second axis are substantially orthogonal relative to each other.

In one embodiment, the third axis and the second axis are substantially orthogonal relative to each other.

In one embodiment, the apparatus further comprises a spring disposed between a portion of first bracket and a portion of the third bracket.

In one embodiment, the apparatus further comprises a bushing disposed about a portion of the shaft adjacent the bracket, and wherein the spring is disposed about the shaft adjacent to the bushing.

In one embodiment, the spring is positioned between the bushing and the portion of the third bracket.

In one embodiment, the apparatus further comprises a spring disposed about the shaft.

Features, elements, components or mechanisms of one embodiments may be combined with features elements, components or mechanisms of other embodiments without limitations.

BRIEF DESCRIPTION OF THE SEVERAL VIEWS OF THE DRAWINGS

The foregoing and other advantages of embodiments of the disclosure will become apparent upon reading the following detailed description and upon reference to the drawings in which.

DETAILED DESCRIPTION OF THE EMBODIMENTS OF THE DISCLOSURE

Figure 1:
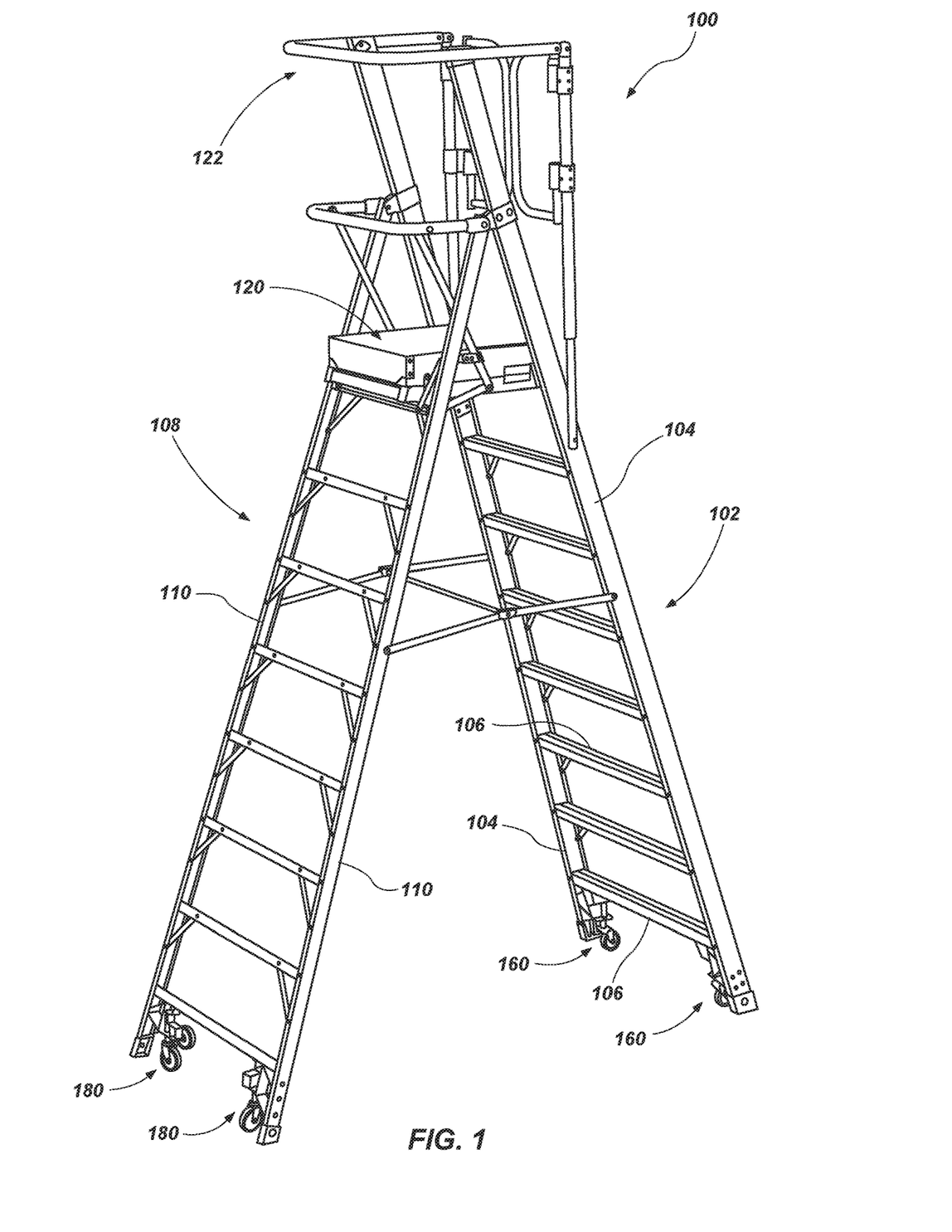
FIG. 1 is a front-side perspective view of an elevated platform apparatus in a deployed or operational state in accordance with an embodiment of the present disclosure.

Referring generally to FIG. 1, an elevated platform apparatus 100 is shown (referred to herein as the "apparatus" for purposes of convenience). The apparatus 100 includes a first assembly 102 having a pair of spaced apart rails 104 with a plurality of rungs 106 extending between, and coupled to, the rails 104. The rungs 106 are substantially evenly spaced, parallel to one another, and are configured to be substantially level when the apparatus 100 is in an orientation for intended use, so that they may be used as "steps" for a user to ascend (or descend) the apparatus 100. While the apparatus 100 shown in drawings depicts a certain number of rungs 106, it is noted that the present apparatus 100 may be configured at a variety of heights, with any number of rungs.

The apparatus 100 also includes a second assembly 108 having a pair of spaced apart rails 110 with a plurality of cross-braces extending between, and coupled to, the spaced apart rails 110. In some embodiments, the cross-braces may be configured as rungs such that rungs are accessible on both sides of the apparatus 100.

The assemblies 102 and 108 may be pivotally coupled to one another by way of pivot brackets or hinge members enabling them to extend into a deployed condition where they are positioned such that their lower ends are spaced apart from one another (creating a stable base for the apparatus 100), and collapse into a stowed condition where their lower ends are positioned relatively close to one another.

The apparatus 100 may further include a platform 120 associated with the rail assemblies 102 and 108 and a safety enclosure, referred to herein as a cage 122, may be spatially formed about the platform to encompass a worker while standing on the platform 120. These components are collapsible with the first and second assemblies, enabling the entire apparatus 100 to be placed in stowed or stored condition. Examples of such an apparatus are set forth, for example, in U.S. Patent Publication No. US20130186710 entitled ELEVATED WORKING PLATFORM AND RELATED METHODS, published Jul. 25, 2013, and U.S. Patent Publication No. 20170226803 entitled ELEVATED WORKING PLATFORM AND RELATED METHODS, published Aug. 10, 2017, the disclosures of which are incorporated by reference herein in their entireties.

While the apparatus is shown in the drawings as a "fixed height" apparatus, in other embodiments the first assembly 102 and outer assembly 108 may include "outer" and "inner" assemblies that enable the height of the apparatus 100 to be selectively adjusted such as described in the previously incorporated U.S. Patent Publication No. US20130186710. Additionally, it is noted that, in such embodiments, the first and second assemblies 102 and 108 may be independently adjustable such that they each may extend to varying elevations enabling the overall height of the apparatus to be selectively adjusted.

In addition to the examples set forth in the previously incorporated documents, such assemblies 102 and 108 may be constructed, for example, as described in U.S. Pat. No. 4,182,431, entitled COMBINATION EXTENSIONS AND STEP LADDER RUNGS THEREFOR, the disclosure of which is incorporated by reference herein in its entirety. Further, examples of adjustment mechanisms for the selective elevation or height adjustment of such assemblies are described in the aforementioned U.S. Pat. No. 4,182,431, or it may be of a different configuration. Additional examples of adjustment mechanisms and adjustable assemblies are described in U.S. Patent Application Publication No. 2009/0229918 entitled LADDERS, LADDER COMPONENTS AND RELATED METHODS, published Sep. 17, 2009, the disclosure of which is incorporated by reference herein in its entirety.

The first and second assemblies 102 and 108 may be formed of a variety of materials and using a variety of manufacturing techniques. For example, in one embodiment, the rails 104 and 110 may be formed of a composite material, such as fiberglass, while the rungs and other structural components may be formed of aluminum or an aluminum alloy. In other embodiments, the assemblies 102 and 108 (and their various components) may be formed of other materials including other composite materials, plastics, polymers, metals, metal alloys or combinations of such materials. Additionally, in various embodiments, the rungs may be coupled with their associated rails in a manner such as described in U.S. Pat. No. 7,086,499 entitled LIGHT WEIGHT LADDER SYSTEMS AND METHODS, the disclosure of which is incorporated by reference herein in its entirety. Of course, other manners of joining or coupling the rungs with the rails (and assembling of other described components) may be used as will be appreciated by those of ordinary skill in the art.

Figure 2:
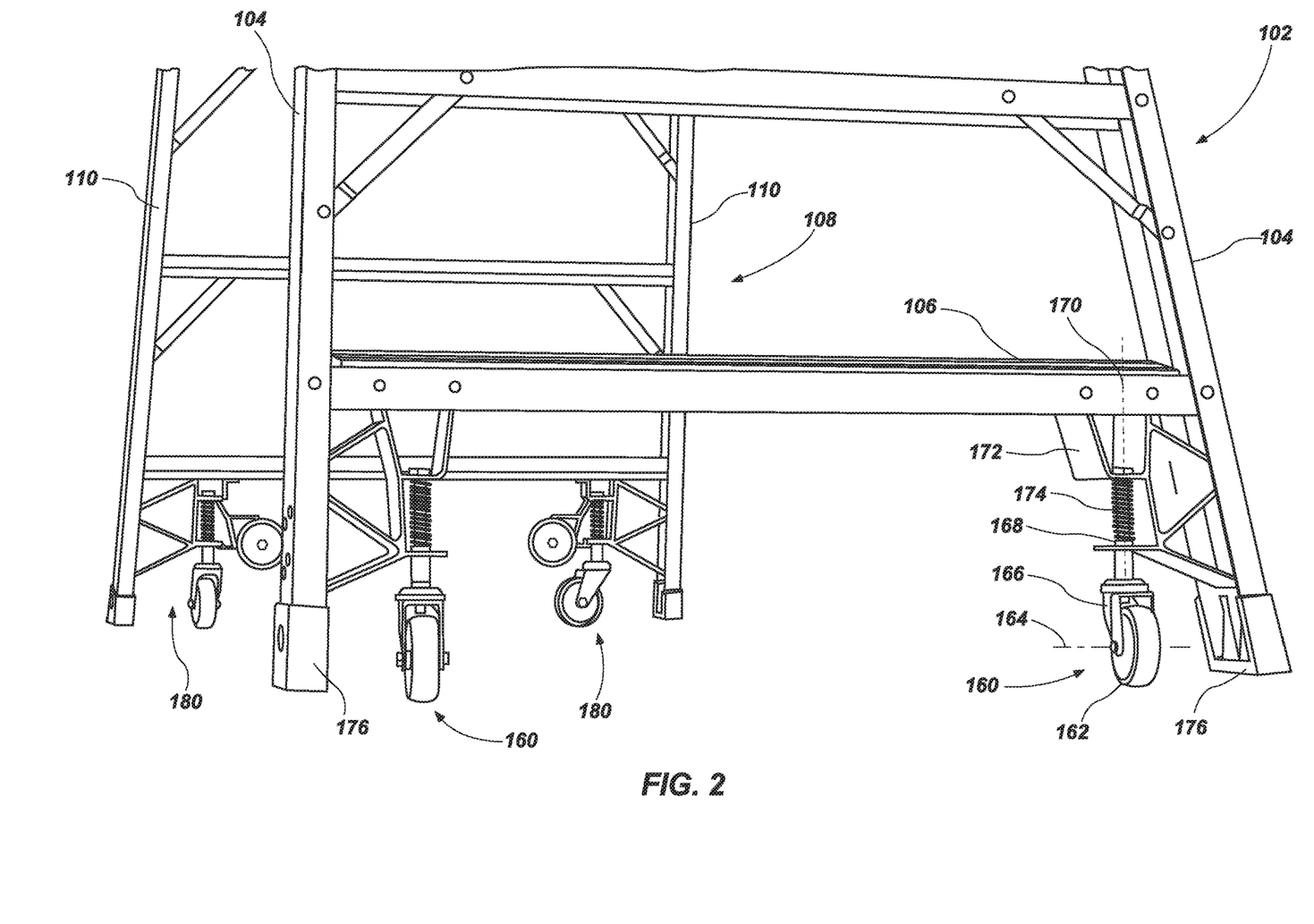
FIG. 2 is enlarged view of a portion of the elevated platform apparatus shown in FIG. 1.
Figure 3:
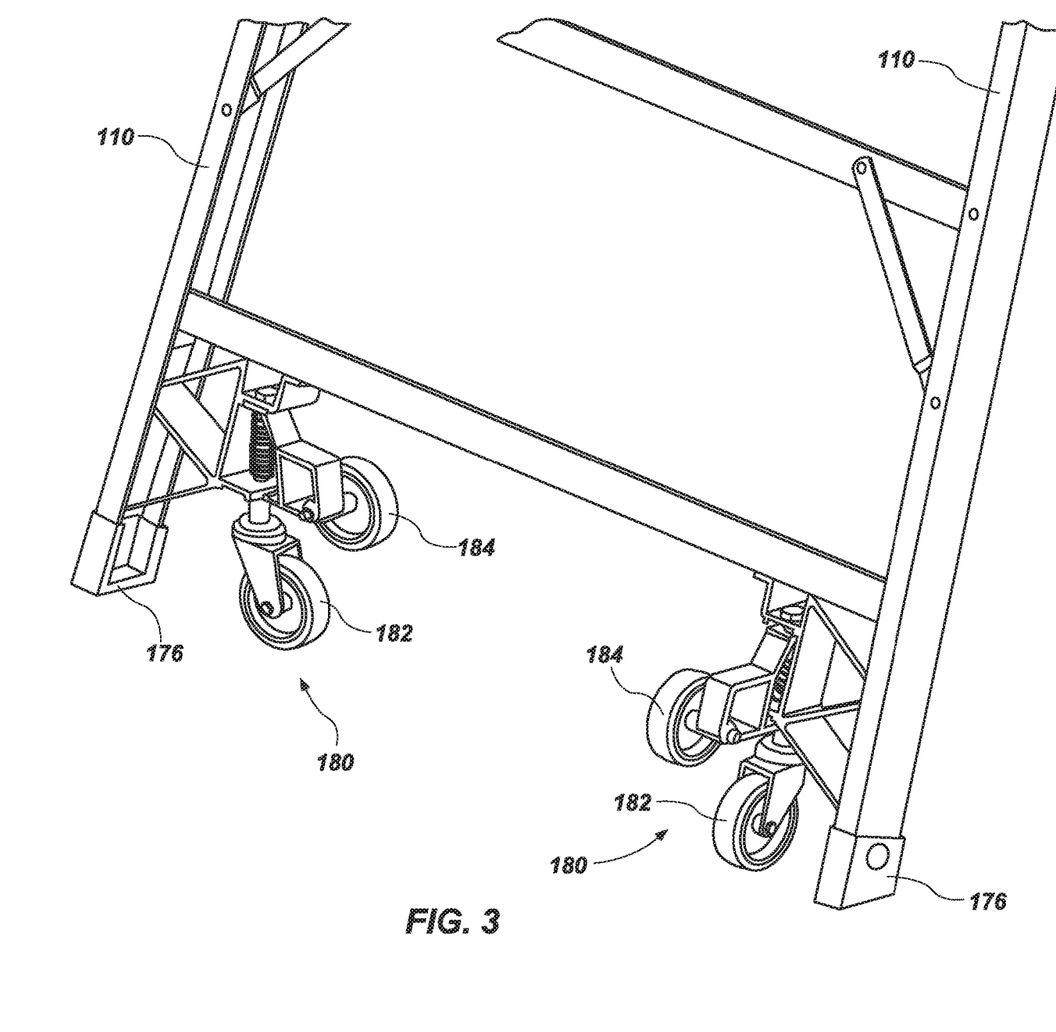
FIG. 3 is an enlarged view of a portion of elevated platform apparatus shown in FIG. 1.

As seen in FIGS. 1 and 2, the apparatus 100 may further include a pair of casters 160 coupled with the first assembly 102 and a pair of caster assemblies 180 coupled with the second assembly 108. Each caster 160 associated with the first assembly 102 may include a wheel 162 that rotates or spins about a first axis 164 relative to a caster bracket 166 or other structure coupled with a shaft 168. The caster bracket (and associated wheel 162) are pivotable or rotatable about a second axis 170 relative to a mounting bracket 172 (e.g., a bracket connecting the caster 160 and related components to a rung 106, rail 104 and/or other component of the first assembly 102). In one embodiment, the first and second axes 164 and 170 may be substantially orthogonal to each other. The bracket 166, shaft 168 and wheel 162 may be configured to be axially displaced along the second axis 170 relative to the mounting bracket 172. A spring 174 or other biasing member may be associated with the shaft 168 biasing the wheel 162, bracket 166 and/or shaft 168 downwards (e.g., away from the rung 106 and towards a supporting surface such as the ground or floor). The spring 174 is configured such that, when the apparatus 100 is in a deployed state, and when it is subjected to only the weight of the apparatus 100, the wheel maintains contact with the floor or other support surface, but the associated rails 104 (including the feet 176 at the lowermost portions of the rails 104) are not in contact with the floor. However, when a minimal threshold of weight is added to the apparatus (e.g., such as associated with a user climbing on the apparatus 100), the biasing force of the spring 174 is overcome such that the feet 176 also come in contact with the floor or other support surface.

Referring more specifically to FIGS. 3-9, the caster assembly 180 associated with the second assembly 108 is shown and described. It is noted, that while the casters 160 are shown and described as being associated with the first assembly 102, and the caster assemblies 180 are shown and described as being associated with the second assembly 108, that this arrangement may be reversed in other embodiments.

Each caster assembly 180 includes what will be referred to herein as a caster wheel 182 and a drag wheel 184. The caster wheel 182 may be configured substantially similar to the caster 160 described above, including rotation about a first axis 186, a caster bracket 190 or other structure and a shaft 192. The caster bracket 190 (and associated caster wheel 182) are pivotable or rotatable about a second axis 194 relative to a mounting bracket 204. A spring 196 or other biasing member may also be associated with the shaft 192 and caster bracket 190 in a manner similar to that described above with respect to caster 160. In one embodiment, the spring may be disposed about the shaft 192 and between a portion of the caster bracket 190 and a portion of the drag bracket 200. In another embodiment, the spring may be disposed between a bushing (disposed about a portion of the shaft 192) and a portion of the drag bracket 200.

The drag wheel 184 is coupled to the drag bracket 200 or other structure and is configured to rotate, relative to the bracket 200, about an axis 202. In one embodiment, this axis 202 of rotation may be substantially orthogonal to the second axis 194 along which the shaft 192 extends and about which it rotates. The drag bracket 200 is pivotally coupled to the shaft 192 and selectively engages another bracket 204 (referred to as the mounting bracket for convenience, and which is mounted to the rail 110, cross-member and/or other components of the second assembly 108) to selectively lock the drag bracket 200 and drag wheel 184 in one of a first position and at least a second position relative to the associated rail 110.

Figure 4:
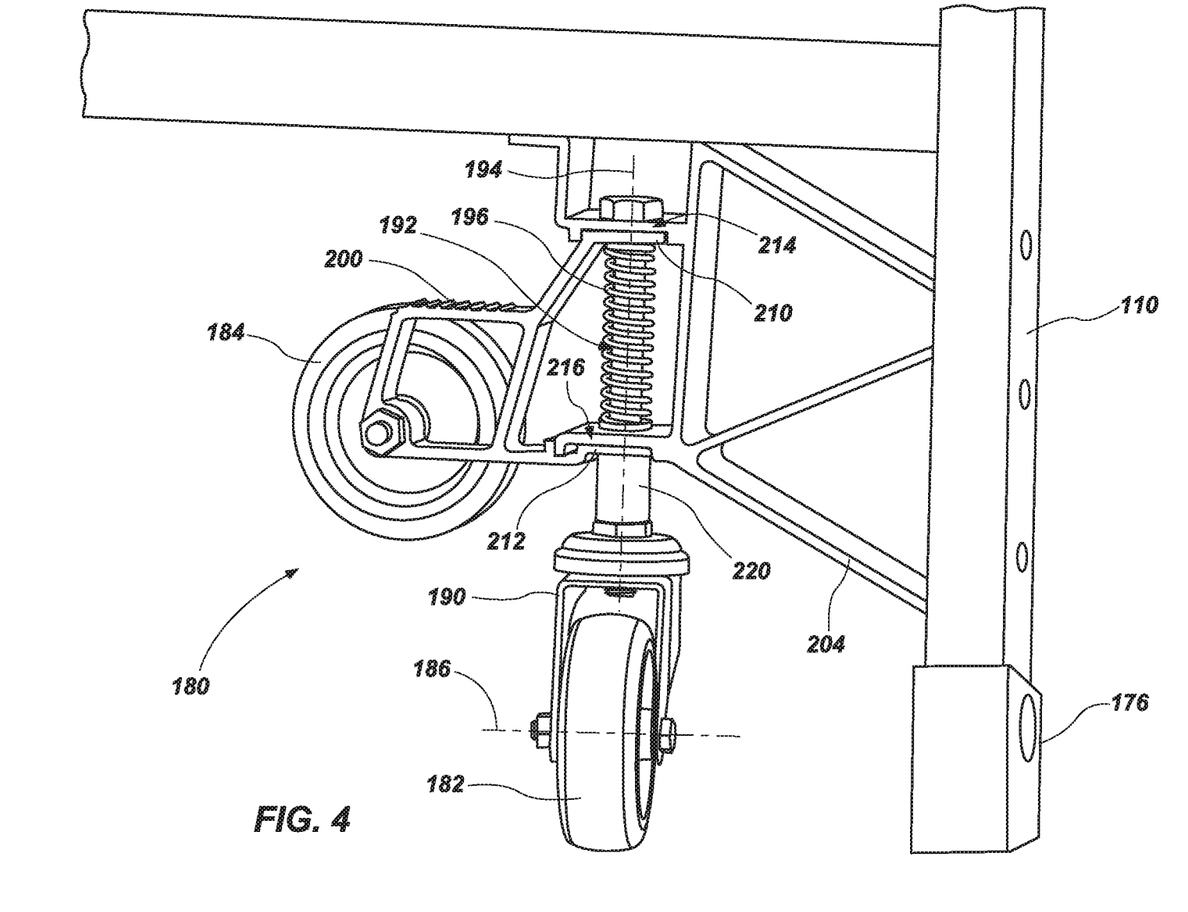
FIG. 4 is a front view of a caster assembly in a first state according to an embodiment of the present disclosure.
Figure 5:
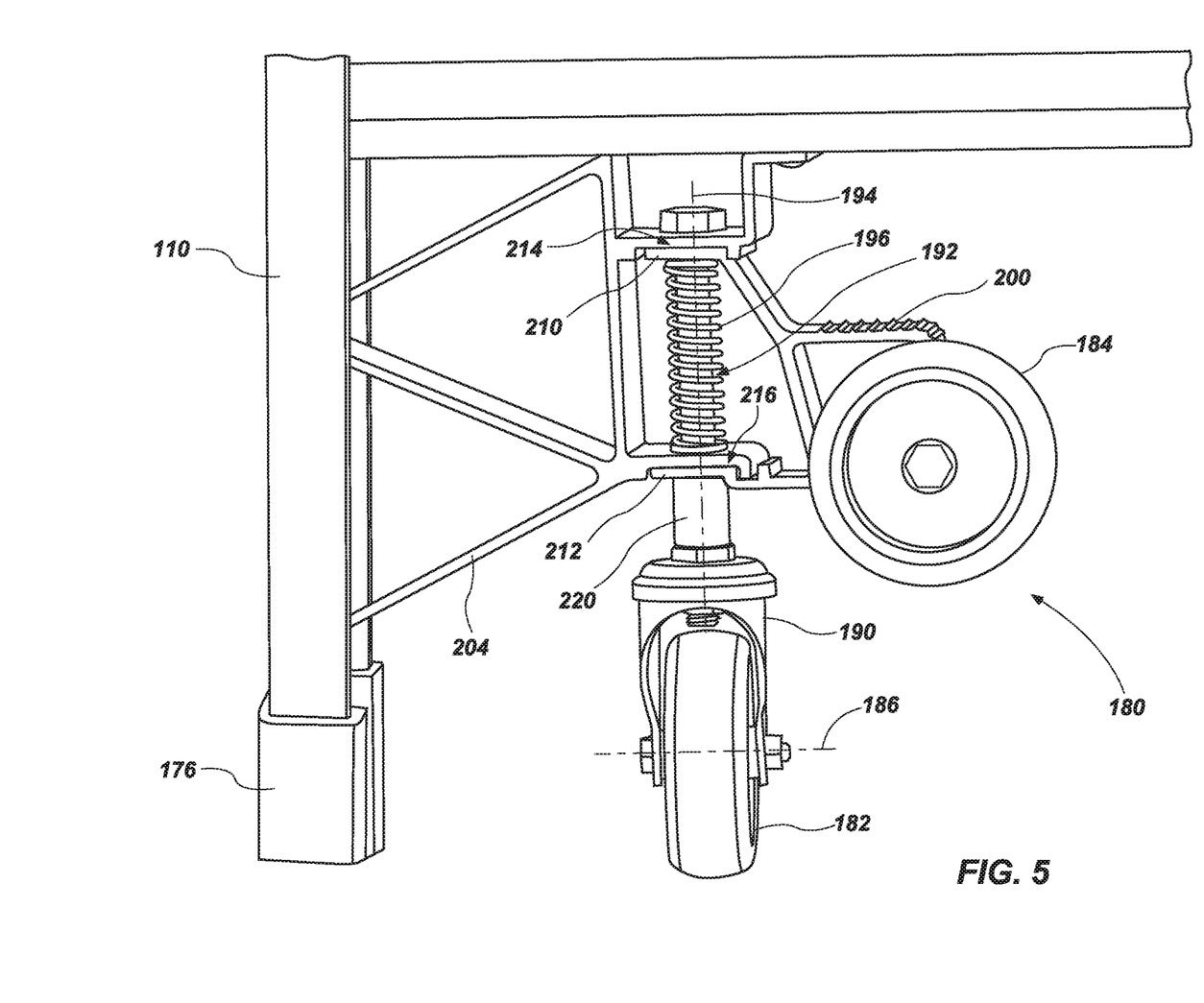
FIG. 5 is a rear view of a caster assembly in a first state according to an embodiment of the present disclosure.

For example, as seen in FIGS. 4 and 5 (showing front and rear views of the caster assembly 180, respectively), the drag bracket 200 and the drag wheel 184 are locked in a first position (which may also be referred to as the 0° position) where the wheel 184 extends inwardly from an associated rail 110 towards the opposing rail. In other words, the drag bracket 200 and the drag wheel 184 are positioned within a volumetric envelope substantially defined by the rails 110 of the second assembly 108. When in the stored or 0° position, tabs 210 and 212 of the drag bracket 200 engage mating recesses 214 and 216 or other mating, keyed features of the mounting bracket 204 to lock the drag bracket 200 into the selected (e.g., stored) position.

Figure 6:
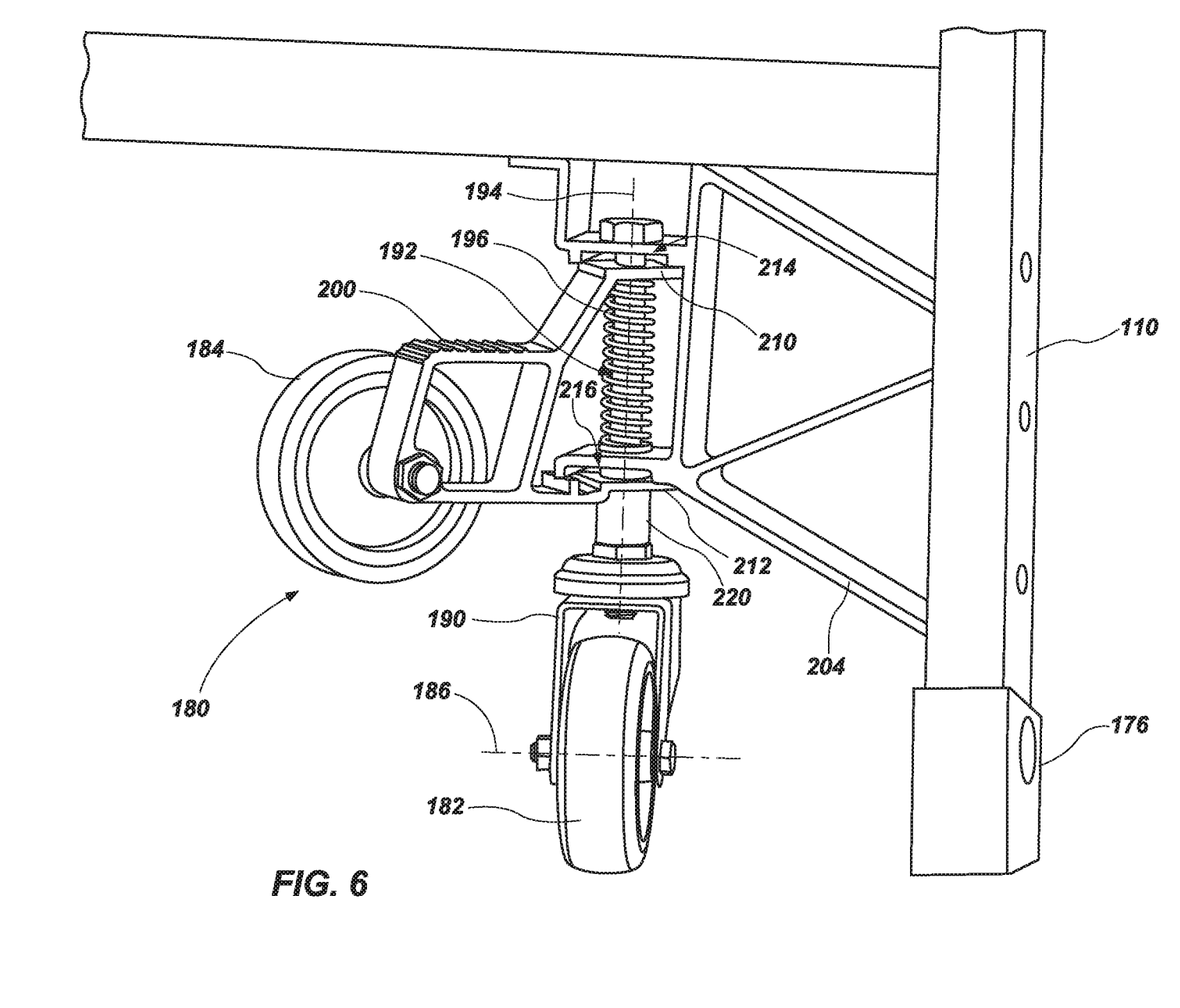
FIG. 6 is a front view of a caster assembly transitioning to a second state according to an embodiment of the present disclosure.
Figure 7:
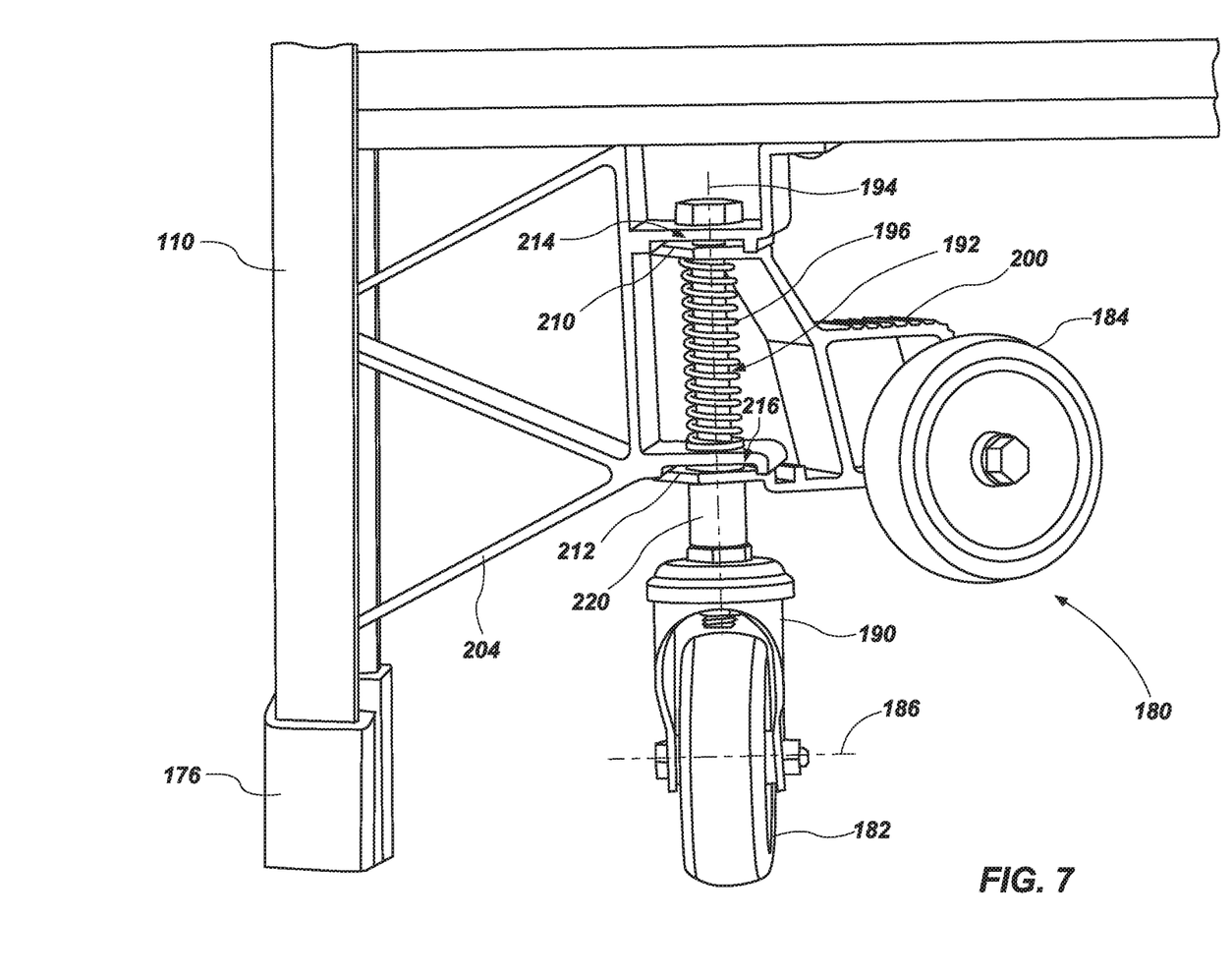
FIG. 7 is a rear view of a caster assembly transitioning to a second state according to an embodiment of the present disclosure.

As seen in FIGS. 6 and 7 (showing front and rear views of the caster assembly 180, respectively), the drag bracket 200 may be displaced downwards towards the caster wheel 182 against the force of the spring 194 such that the tabs 210 and 212 disengage their associated recesses 214 and 216, enabling the drag bracket 200 and drag wheel 184 to rotate about the shaft 192.

Figure 8:
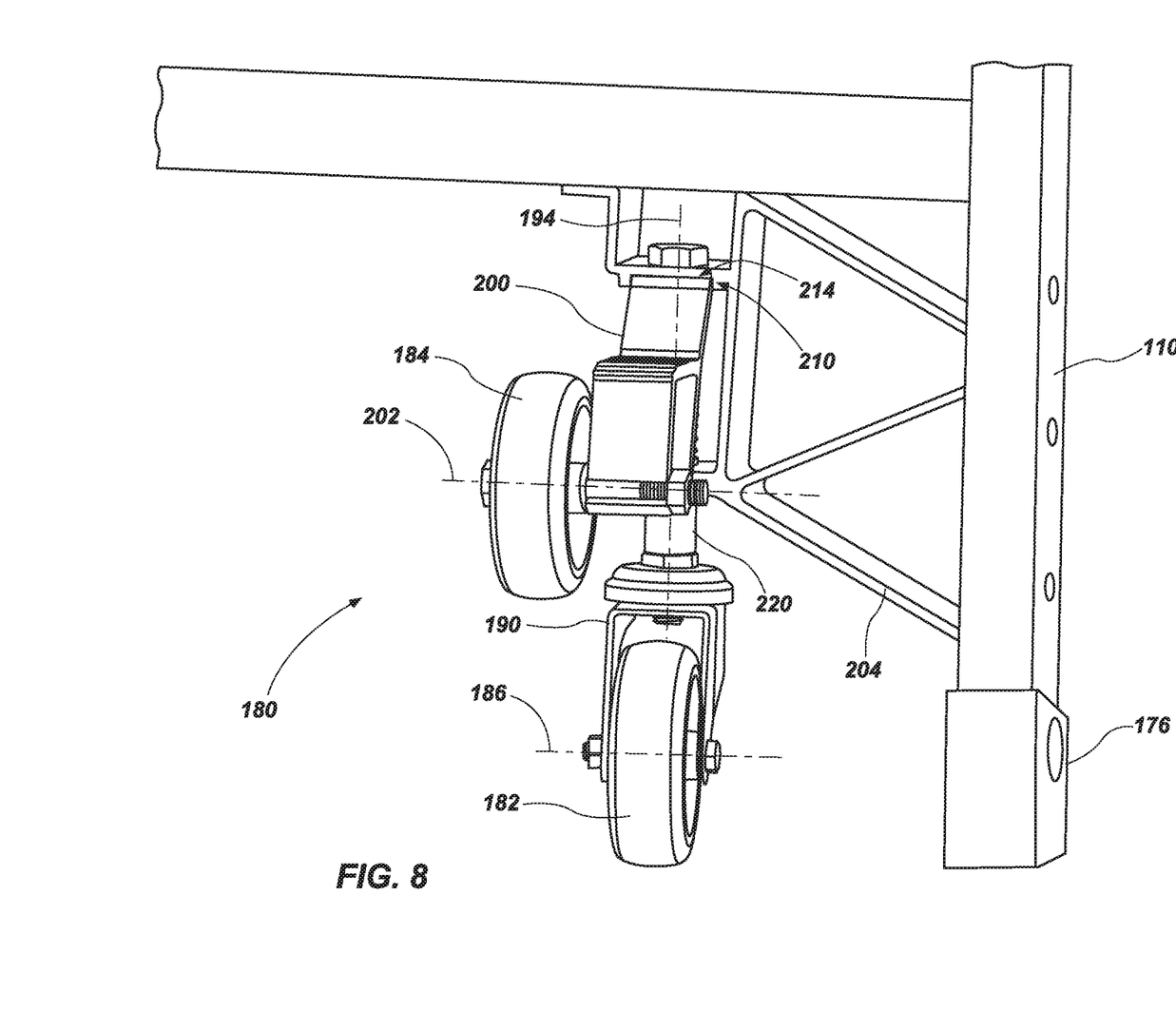
FIG. 8 is a front view of a caster assembly in a second state according to an embodiment of the present disclosure.
Figure 9:
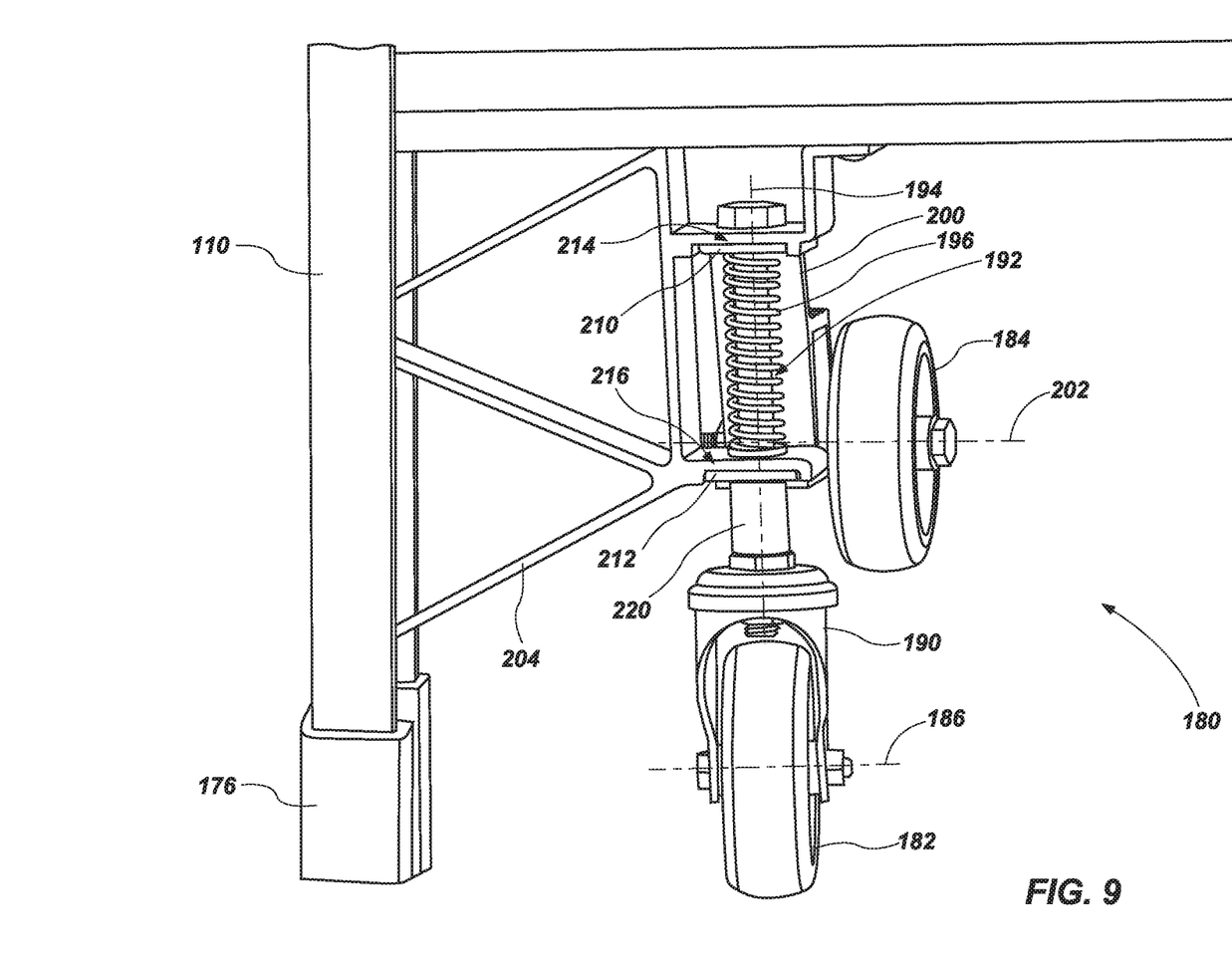
FIG. 9 is a rear view of a caster assembly in a second state according to an embodiment of the present disclosure.

As seen in FIGS. 8 and 9 (showing front and rear views of the caster assembly 180, respectively), the drag bracket is in a deployed position (which may also be referred to as the 90° position) such that the drag bracket 200 and drag wheel 184 extend generally outward from the second assembly (at an angle substantially 90° to the stored position), protruding beyond the volumetric envelope defined by the rails 110 of the second assembly 108. When in the deployed position, the tabs 210 and 212 again engage the recesses 214 and 216 of the mounting bracket 204 (the spring 196 pushing the drag bracket 202 upwards relative to the mounting bracket 204) to lock the drag bracket 200 from movement relative to the mounting bracket 204.

When the apparatus 100 is in a deployed condition, the drag wheels 184 do not contact the ground or supporting surface regardless of which position the wheels are in. However, when in the drag wheels 184 are in the deployed state (FIGS. 8 and 9), the drag wheels 184 may engage the ground when the apparatus 100 is collapsed (see, e.g., FIGS. 5 and 6 of U.S. Publication No. 20170226803) and then tilted beyond a given angle. This enables the drag wheels 184 to be used to roll the apparatus (e.g., such as by being dragged or pushed by a user) when the apparatus 100 is in a collapsed state, while preventing the apparatus 100 from rolling on the drag wheels 184 when it is in a deployed condition.

As noted above, the ability to move the drag wheels 184 to the stowed position (FIGS. 4 and 5) enable the drag wheels 184 to be placed substantially within a volumetric envelope defined by the outer surfaces of the rails 110 of the second assembly 108. This provides a variety of advantages. For example, keeping the wheels 184 within the defined envelope makes the apparatus smaller for purposes of transportation and storage. Additionally, keeping the wheels 184 within the defined envelope helps to protect the wheels from inadvertent damage (e.g., during transportation) when the wheels are not needed by the user to roll the apparatus from location to another.

The caster wheels 182, combined with the casters 160, are configured such that when subjected to only the weight of the apparatus 100, the rails 104 and 110 of the apparatus are not in contact with the ground and the apparatus may be rolled from one position to another (using the caster wheels 182 and the casters 160), while, when a user climbs onto the apparatus 100, the additional weight of the user overcomes the force of the associated springs 174 and 196 causing the lowermost portions of the rails 104 and 110 of the apparatus 100 to engage the ground and stabilize the apparatus 100 (e.g., effectually rendering the casters 160 and caster wheels 182 inoperable with respect to moving the apparatus along the ground).

While the embodiments of the disclosure may be susceptible to various modifications and alternative forms, the specific embodiments have been shown by way of example in the drawings and have been described in detail herein. However, features, aspects and acts of any of the various embodiments described herein may be combined, without limitation, with other described embodiments. Additionally, it should be understood that the invention is not intended to be limited to the particular forms disclosed. Rather, all modifications, equivalents, and alternatives falling within the spirit and scope of the disclosure.

What is claimed is:

1. A caster assembly comprising:
a first bracket;
a first wheel coupled the first bracket and configured to rotate about a first axis;
a shaft coupled to the first bracket and a second bracket, wherein the first bracket is configured to rotate relative to the second bracket about a second axis;
a third bracket coupled with the shaft and being configured to rotate about the second axis relative to the second bracket between a first rotational position and at least a second rotational position, the third bracket configured to be selectively locked relative to the second bracket in each of the first rotational position and the at least a second rotational position; and
a second wheel coupled with the third bracket, the second wheel configured to rotate relative to the third bracket about a third axis.

2. The assembly of claim 1, wherein the first position is approximately 90° from the at least a second position about the second axis.

3. The assembly of claim 1, wherein the first axis and the second axis are substantially orthogonal relative to each other.

4. The assembly of claim 1, wherein the third axis and the second axis are substantially orthogonal relative to each other.

5. The assembly of claim 1, further comprising a spring disposed between a portion of first bracket and a portion of the third bracket.

6. The assembly of claim 5, further comprising a bushing disposed about a portion of the shaft adjacent the third bracket, and wherein the spring is disposed about the shaft adjacent to the bushing.

7. The assembly of claim 6, wherein the spring is positioned between the bushing and the portion of the third bracket.

8. The assembly of claim 1, further comprising a spring disposed about the shaft.

9. An elevated platform apparatus comprising:
a first assembly having a pair of rails;
a second assembly having a pair of rails, the second assembly being hingedly coupled with the first assembly;
a caster assembly coupled with the first assembly, the caster assembly comprising:
a first bracket;
a first wheel coupled the first bracket and configured to rotate about a first axis;
a shaft coupled to the first bracket and a second bracket, wherein the first bracket is configured to rotate relative to the second bracket about a second axis;
a third bracket coupled with the shaft and being configured to rotate about the second axis relative to the second bracket between a first rotational position and at least a second rotational position, the third bracket configured to be selectively locked relative to the second bracket in each of the first rotational position and the at least a second rotational position; and
a second wheel coupled with the third bracket, the second wheel configured to rotate relative to the third bracket about a third axis.

10. The apparatus of claim 9, further comprising a platform pivotally coupled to the first assembly.

11. The apparatus of claim 10, wherein the first assembly and the second assembly are configured to pivot relative to each other between a deployed state and a collapsed state, wherein when the first and second assemblies are in the deployed state, the platform extends from the first assembly and engages a portion of the second assembly.

12. The apparatus of claim 11, further comprising a cage associated with the platform, the cage including at least one bar and at least one gate, the at least one gate being configured to swing in a first direction upon a user stepping on to the platform from the first rail assembly, and swing back to a closed position after the user is standing on the working surface of the platform, the at least one gate also being limited from being displaced in a second direction, opposite the first direction, beyond the closed position.

13. The apparatus of claim 9, wherein the first position is approximately 90° from the at least a second position about the second axis.

14. The apparatus of claim 9, wherein the first axis and the second axis are substantially orthogonal relative to each other.

15. The apparatus of claim 9, wherein the third axis and the second axis are substantially orthogonal relative to each other.

16. The apparatus of claim 9, further comprising a spring disposed between a portion of first bracket and a portion of the third bracket.

17. The apparatus of claim 16, further comprising a bushing disposed about a portion of the shaft adjacent the third bracket, and wherein the spring is disposed about the shaft adjacent to the bushing.

18. The apparatus of claim 17, wherein the spring is positioned between the bushing and the portion of the third bracket.

19. The apparatus of claim 9, further comprising a spring disposed about the shaft.

\* \* \* \* \*